(12) United States Patent
Wu et al.

(10) Patent No.: US 9,208,961 B2
(45) Date of Patent: Dec. 8, 2015

(54) DISPLAY AND HOUSING THEREOF

(71) Applicants: Inventec Appliances (Pudong) Corporation, Shanghai (CN); INVENTEC APPLIANCES CORP., New Taipei (TW); INVENTEC APPLIANCES (SHANGHAI) CO., LTD., Shanghai (CN)

(72) Inventors: Tsung Yao Wu, New Taipei (TW); Chien Hsiu Kao, New Taipei (TW)

(73) Assignees: INVENTEC APPLIANCES (PUDONG) CORPORATION, Shanghai (CN); INVENTEC APPLIANCES CORP., New Taipei (TW); INVENTEC APPLIANCES (SHANGHAI) CO., LTD., Shanghai (CN)

( * ) Notice: Subject to any disclaimer, the term of this patent is extended or adjusted under 35 U.S.C. 154(b) by 307 days.

(21) Appl. No.: 13/829,947

(22) Filed: Mar. 14, 2013

(65) Prior Publication Data

US 2014/0043256 A1 Feb. 13, 2014

(30) Foreign Application Priority Data

Aug. 7, 2012 (CN) .......................... 2012 1 0279271

(51) Int. Cl.
*G06F 1/16* (2006.01)
*H01H 9/02* (2006.01)
*G06F 3/03* (2006.01)

(52) U.S. Cl.
CPC ............... *H01H 9/02* (2013.01); *G06F 1/1626* (2013.01); *G06F 1/1643* (2013.01); *G06F 3/03* (2013.01)

(58) Field of Classification Search
CPC combination set(s) only.
See application file for complete search history.

(56) References Cited

U.S. PATENT DOCUMENTS

| | | | |
|---|---|---|---|
| 6,532,152 B1* | 3/2003 | White et al. | 361/692 |
| 6,654,232 B1* | 11/2003 | Tsao et al. | 361/679.59 |
| 6,751,552 B1* | 6/2004 | Minelli | 701/454 |
| 2010/0110033 A1* | 5/2010 | Sakai | 345/173 |
| 2010/0285850 A1* | 11/2010 | Paleczny et al. | 455/575.1 |
| 2011/0018823 A1* | 1/2011 | Moon | 345/173 |
| 2011/0037726 A1* | 2/2011 | Lee | 345/174 |
| 2011/0148783 A1* | 6/2011 | Lee | 345/173 |
| 2012/0028679 A1* | 2/2012 | Ozasa | 455/556.1 |
| 2012/0133608 A1* | 5/2012 | Chen | 345/174 |
| 2012/0183721 A1* | 7/2012 | Niiyama et al. | 428/76 |
| 2013/0003270 A1* | 1/2013 | Kim et al. | 361/679.01 |
| 2013/0169575 A1* | 7/2013 | Masuda et al. | 345/173 |
| 2014/0084762 A1* | 3/2014 | Lai | 312/223.1 |

* cited by examiner

*Primary Examiner* — Lisa Lea Edmonds
(74) *Attorney, Agent, or Firm* — Muncy, Geissler, Olds & Lowe, P.C.

(57) ABSTRACT

A display and housing thereof is disclosed. The housing is applied for assembling a touch panel, and comprises a first case, a buffering structure and a joint structure. The first case has an accommodating space at one side of the first case to accommodate the touch panel. The buffering structure is made of soft material, and the outer edge of the buffering structure connects the first case, and the inner edge of the buffering structure extends toward the accommodating space. The joint structure is made of hard material, and one side of the joint structure connects with one side of the buffering structure. The touch panel is connected with the first case, and the another side of the joint structure being opposite to the side connected with the buffering structure is connected to the touch panel upon the touch panel being accommodated in the accommodating space.

9 Claims, 5 Drawing Sheets

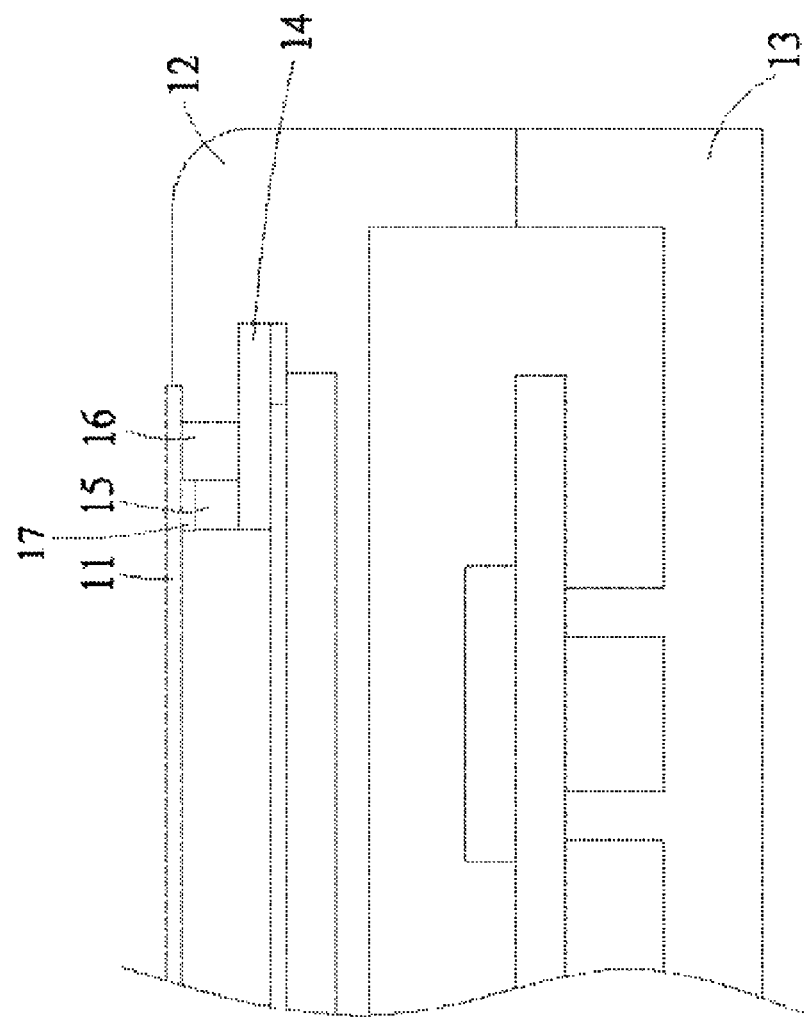

DISPLAY AND HOUSING THEREOF

CROSS-REFERENCE TO RELATED APPLICATION

This application claims the benefit of China Patent Application No. 201210279271.6, filed on Aug. 7, 2012, in the State Intellectual Property Office of the People's Republic of China, the disclosure of which is incorporated herein in its entirety by reference.

BACKGROUND OF THE INVENTION

1. Field of the Invention

The present invention generally relates to a display and housing thereof, particularly related to a display using a housing, which is injection molding with a hard material and a soft material, to assemble a touch panel for preventing the touch panel from being damaged easily, and housing thereof.

2. Description of the Related Art

Due to the great improvement in technology, most of electronic products having display function are equipped with touch screens as display screens. Upon the combination of touch panel and related components, user can execute operation and control by using the screen.

At present, the assembly of the touch panel and the corresponding component (or housing) is mostly performed by the manners shown in FIG. 1 or FIG. 2. As shown in FIG. 1, conventional touch panel module comprises an upper housing 10 and a touch panel 20. The upper housing 10 and the touch panel 20 are connected by gluing. The upper housing 10 mostly is made of hard material, and the touch panel 20 is directly contacted to portion of the upper housing 10. By such assembly, while this touch panel module falls to ground, the upper housing 10 made of the hard material cannot absorb the impact force, so the upper housing 10 cannot protect the touch panel 20 from being cracked.

Moreover, as shown in FIG. 2, another conventional touch panel module comprises an upper housing 100, a touch panel 200, and a buffering structure 300 of which the outer edge is connected with an inner side of the upper housing 100. The buffering structure 300 is made of soft material for bearing and connecting to the touch panel 200. The connection among the touch panel 200, buffering structure 300 and upper housing 100 is performed by spot glue 400. Because the buffering structure 300 is made of soft material, the buffering structure 300 is easily deformed. If the touch panel 200 is directly placed and connected with the buffering structure 300, the touch panel 200 is easily damaged due to deformation of the buffering structure 300.

In view of the above description, two designs of conventional touch panel assembly structure make the touch panel crack and damaged easily, and must use doted glue to connect the touch panel and the housing, so the cost of assembly will be increased and it takes more time to disassemble such structure. Therefore, the present invention provides a new design for solving these problems to assemble the touch panel and corresponding component without the occurrence of these problems.

SUMMARY OF THE INVENTION

In view of the problem in the prior art, it is one objective of the present invention to provide a display and housing thereof, in order to solve the problem that design of the touch panel assembly structure in the prior art makes the touch panel be cracked easily.

According to the objective of the present invention, a housing applied for assembling a touch panel is provided. The housing comprises a first case, a buffering structure and a joint structure. The first case has an accommodating space at one side of the first case to accommodate the touch panel. The buffering structure is made of soft material, and the outer edge of the buffering structure connects the first case, and the inner edge of the buffering structure extends toward the accommodating space. The joint structure is made of hard material, and one side of the joint structure connects with one side of the buffering structure. The touch panel is connected with the first case, and the another side of the joint structure being opposite to the side connected with the buffering structure is connected to the touch panel upon the touch panel being accommodated in the accommodating space.

Preferably, an interval is between the joint structure and the first case.

Preferably, the material used to make the joint structure may comprise plastic or metal.

Preferably, the housing of the present invention further comprises a second case, and one side of the second case being movably connected with the side of the first case is opposite to where the touch panel is accommodated.

Preferably, the joint structure and the touch panel are connected by a joint glue.

Preferably, the joint glue is a backside glue coated on the joint structure or the touch panel.

According to another objective of the present invention, a display is provided, The display comprises a touch panel and a housing. The housing is configured to assemble the touch panel and comprises a first case, a buffering structure, a joint structure and a second case. The first case has an accommodating space at one side of the first case to accommodate the touch panel. The buffering structure is made of soft material, and the outer edge of the buffering structure connects the first case, and the inner edge of the buffering structure extends toward the accommodating space. The joint structure is made of hard material, and one side of the joint structure connects with one side of the buffering structure. One side of the second case being movably connected with the side of the first case is opposite to where the touch panel is accommodated. The touch panel is connected with the first case, and the another side of the joint structure being opposite to the side connected with the buffering structure is connected to the touch panel upon the touch panel being accommodated in the accommodating space.

In the display and housing thereof of the present invention, the upper housing is connected with the joint structure made of hard material and the buffering structure made of soft material, and an interval is between the upper housing and the joint structure, and the buffering structure functions as a bearing component for the joint structure. In assembly of the touch panel and the upper housing, the joint structure is used to bear and connect the touch panel, and a buffering support is provided by the buffering structure. Therefore, when the assembled housing and touch panel fall, the impact force due to falling can be absorbed by the buffering structure, so as to make the touch panel not be cracked. Because the touch panel is connected to the joint structure made of hard material, the problem that the touch panel is cracked due to deformation of the buffering structure can be prevented. Moreover, according to the structural design of the present invention the touch panel and the joint structure can be connected by the backside glue, so the cost can be reduced, additionally, time and labor consuming for assembly can be also reduced.

BRIEF DESCRIPTION OF THE DRAWINGS

The detailed structure, operating principle and effects of the present invention will now be described in more details hereinafter with reference to the accompanying drawings that show various embodiments of the invention as follows.

FIG. 5 is a third schematic view of a display and housing thereof according to embodiment of the present invention.

DETAILED DESCRIPTION OF THE PREFERRED EMBODIMENTS

The technical content of the present invention will become apparent by the detailed description of the following embodiments and the illustration of related drawings as follows. For reference, respective components and shapes thereof were schematically drawn or exaggeratedly drawn in the accompanying drawings for easy understanding.

Figure 1:
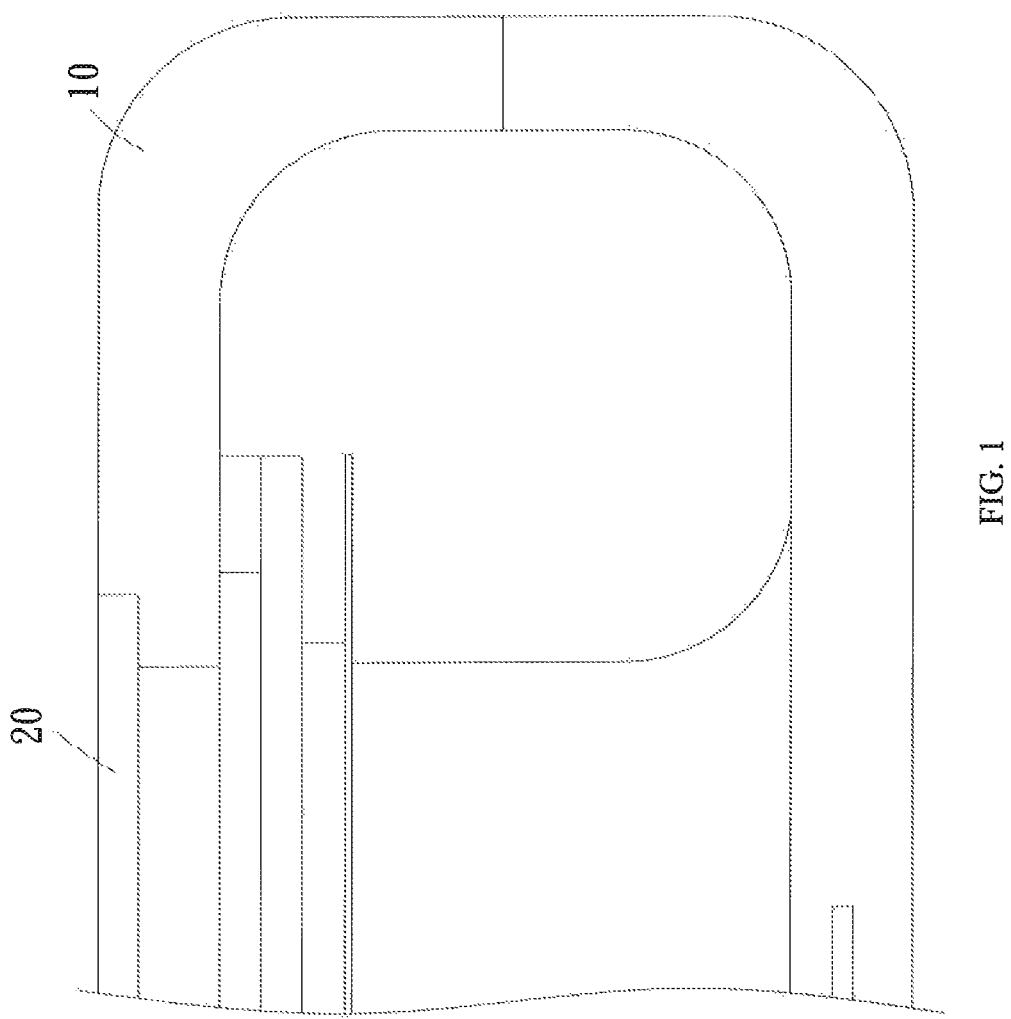
FIG. 1 is a schematic view of assembly of the touch panel and housing in the prior art.
Figure 2:
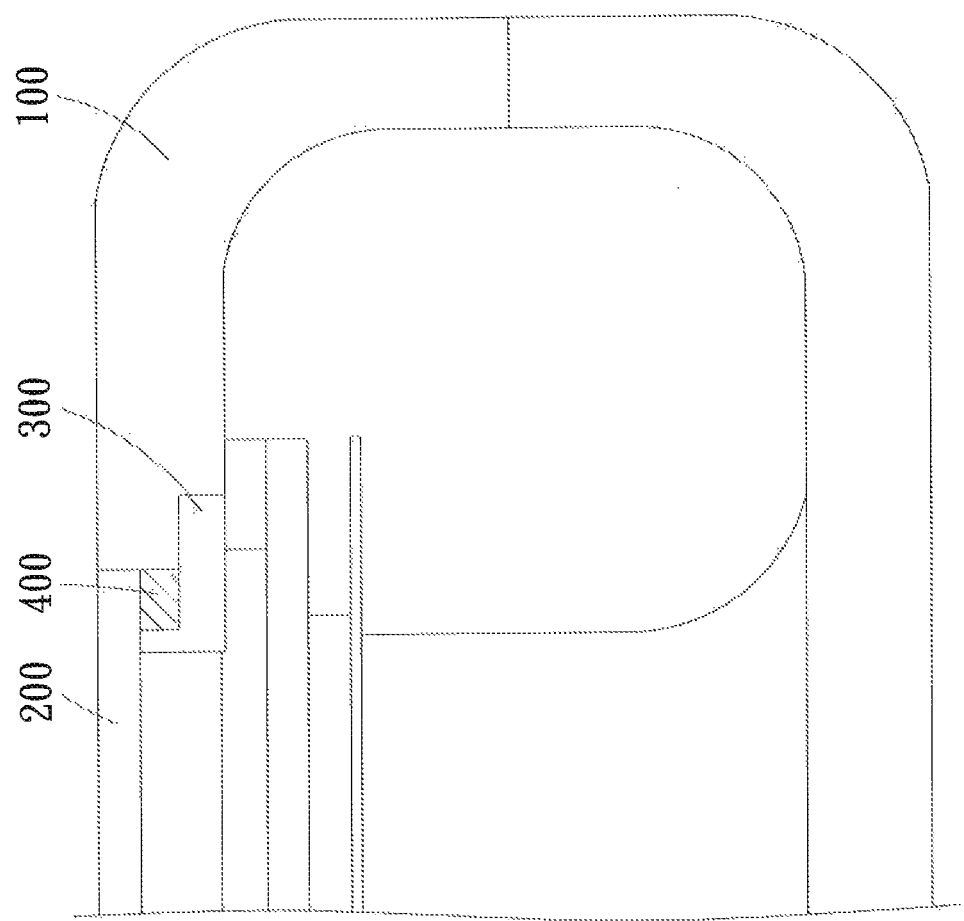
FIG. 2 is a schematic view of another assembly of the touch panel and housing in the prior art.
Figure 3:
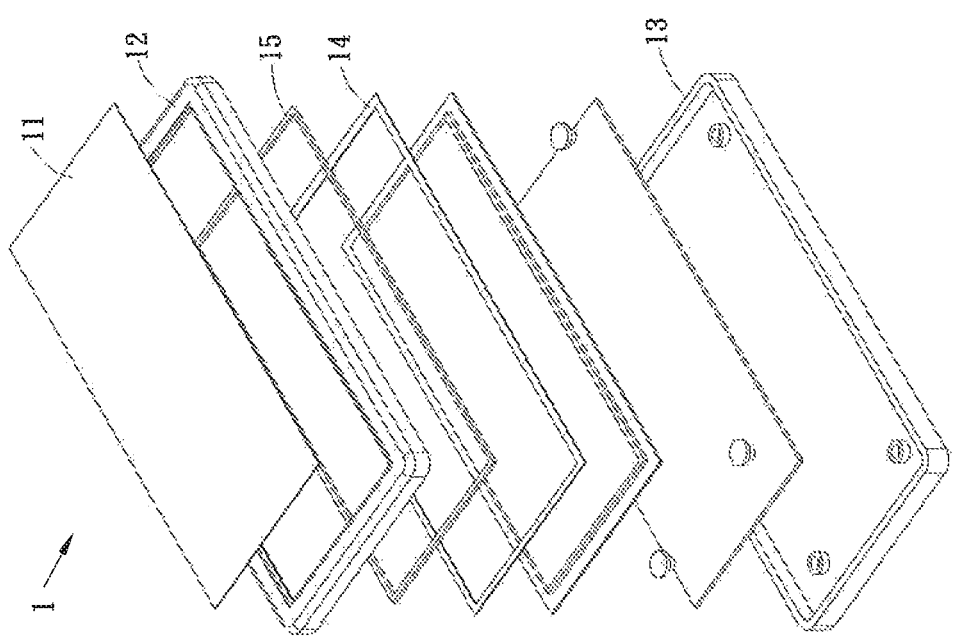
FIG. 3 is a first schematic view of a display and housing thereof according to the embodiment of the present invention.
Figure 4:
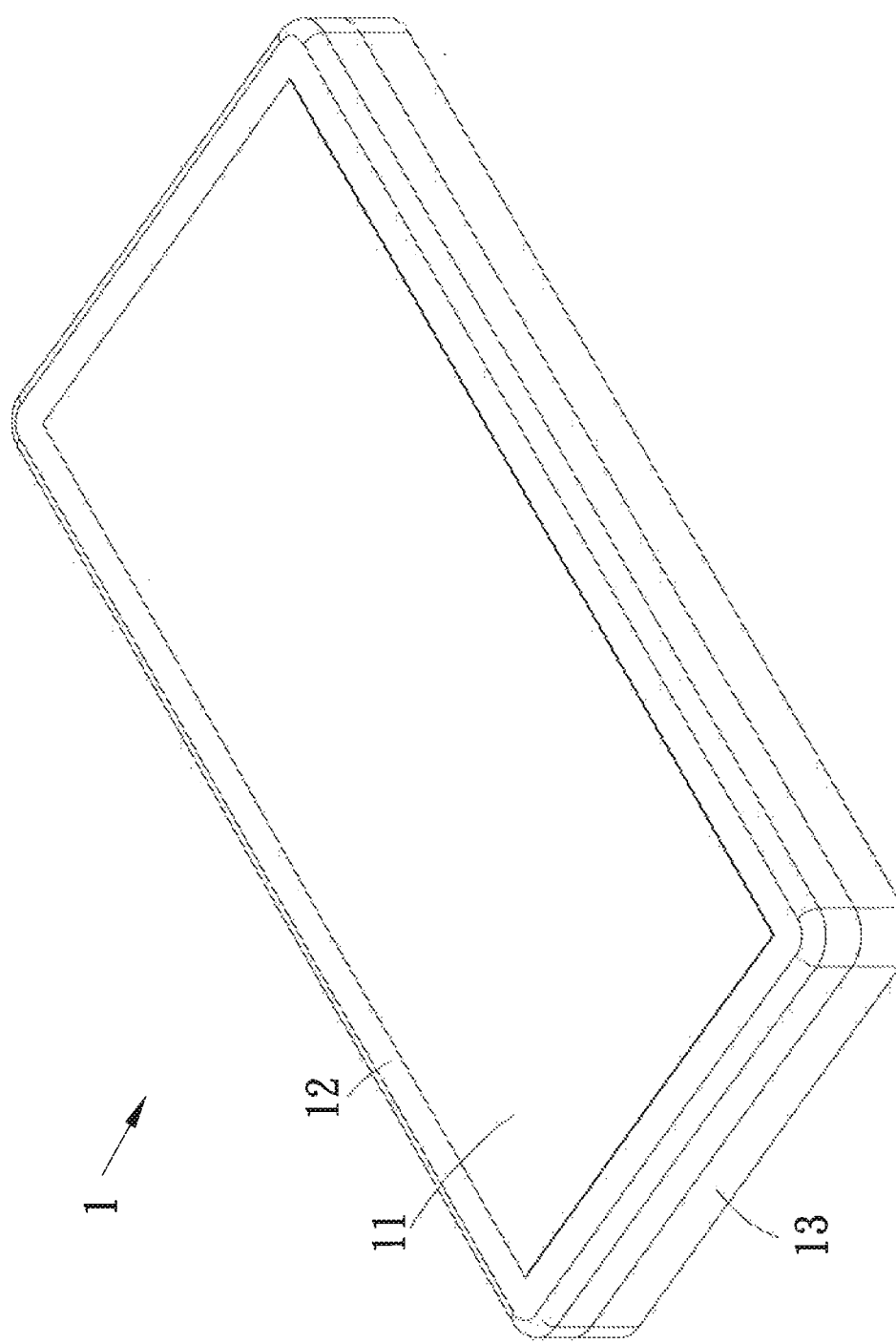
FIG. 4 is a second schematic view of a display and housing thereof according to embodiment of the present invention.

FIGS. 3, 4 and 5 are first schematic view, second schematic view and third schematic view of a display and housing thereof according to one embodiment of the present invention, respectively. In the embodiment, a touch controlled display apparatus 1 comprises a touch panel 11 and the housing of the present invention, and the housing and the touch panel 11 can be assembled correspondingly. The housing comprises a first case 12, a second case 13, a buffering structure 14 and a joint structure 15. The first case 12, the buffering structure 14 and the joint structure 15 can be designed as ring structures corresponding to each other, as shown in FIG. 3. The touch panel 11 may be made of high strength or low strength glass material. The first case 12 and the second case 13 may be made of hard material, such as plastic material including PC/ABS (Polycarbonate/Acrylonitrile Butadiene Styrene). The buffering structure 14 may be made of soft material, such as TPU (Thermoplastic Urethane) or TPE (Thermo Plastic Elastomer). The joint structure 15 may be made of hard material, for example, the material used to make the joint structure 15 may be the same as the plastic material including PC/ABS used to make the first case 12 and the second case 13, and the joint structure 15 also may be made of metal. The material described for each component is an aspect of implementation only, but the present invention is not limited thereto.

The first case 12 and the second case 13 may be movably assembled and connected. The first case 12 has an accommodating space at one side of the first case 12. Preferably, a size of the accommodating space corresponds to size of the touch panel to accommodate the touch panel 11, as shown in FIG. 4. The outer edge of the buffering structure 14 is connected with the first case 12, and inner edge of the buffering structure 14 extends toward the accommodating, space. One side of the joint structure 15 is connected with one side of the buffering structure 14, and the buffering structure 14 is connected with the first case 12 and the joint structure 15 respectively, and an interval 16 is between the joint structure 15 and the first case 12, as shown in FIG. 5. When the touch panel 11 is accommodated and fixed in the accommodating space of the first case 12, the touch panel 11 is placed and contacted on another side of the joint structure 15 being opposite to the side where the joint structure 15 is connected with the buffering structure 14. The touch panel 11 is placed on the joint structure 15, but the buffering structure 14 is below the joint structure 15, therefore, when the touch panel 11 and the housing fall on ground together, the impact force due to falling can be absorbed by the buffering structure 14, and if the interval 16 is between the joint structure 15 and the first case 12, a stronger support force can be further provided to prevent the touch panel 11 from being cracked. The touch panel 11 is placed on the joint structure 15 made of hard material but not placed directly on the buffering structure 14 made of soft material, so as to prevent the touch panel 11 from being damaged due to the softening deformation of the buffering structure 14.

The touch panel 11 and the joint structure 15 are bound by joint glue 17, and preferably the joint glue 17 may be backside glue coated on the joint structure 15 or the touch panel 11, but it is not limited thereto.

Preferably; the joint structure 15 can be made of hard plastic material, but also can use metal instead. Therefore, improvement of both hardness and electrical conductivity can be achieved.

In summary, the touch controlled display apparatus and housing thereof of the present invention have the following advantages:

1. Good anti-strike effect: because the present invention use the buffering structure made of soft material to support the joint structure made of hard material, when the housing falls, the buffering structure can absorb the impact force to protect the touch panel from being cracked.

2. Easy and quick assembly: according to the structure design of the present invention, the touch panel can be bound with the housing by using backside glue, and not need to use doted glue, therefore it is easy and quick for assembly or disassembly.

3. Low cost: the present invention can provide better anti-strike effect, so it is possible to use the touch panel made of glass material with low strength instead of the touch panel made of glass material with high strength, and the cost can be reduced.

While embodiments of the present invention have been described in connection with certain exemplary embodiments, the purpose is to convey the scope of the present invention to those of skill in the art for practice, and it is to be understood that the invention is not limited to the disclosed embodiments, but, on the contrary, is intended to cover various modifications and equivalent arrangements included within the spirit and scope of the appended claims, and equivalents thereof.

What is claimed is:

1. A housing applied for assembling a touch panel, comprising:
    a first case, having an accommodating space at one side of the first case to accommodate the touch panel;
    a buffering structure made of soft material, wherein an outer edge of the buffering structure connects the first case, and an inner edge of the buffering structure extends toward the accommodating space; and
    a joint structure made of hard material, wherein one side of the joint structure connects with one side of the buffering structure;
    wherein, the first case, the buffering structure and the joint structure are ring structures, the touch panel is connected with the first case, and another side of the joint structure being opposite to the one side connected with the buffering structure is connected to the touch panel upon the touch panel being accommodated in the accommodating space,
    wherein the outer edge of the buffering structure connects to the first case and extends beneath a top lip of the first case, and one side of the joint structure connects with the inner edge of the buffering structure.

2. The housing of claim 1, wherein an interval is between the joint structure and the first case.

3. The housing of claim 1, wherein the hard material used to make the joint structure comprises plastic or metal.

4. The housing of claim 1, further comprising a second case, wherein one side of the second case being movably connected with the side of the first case is opposite to where the touch panel is accommodated.

5. The housing of claim 1, wherein the joint structure and the touch panel are connected by a joint glue.

6. The housing of claim 5, wherein the joint glue is a backside glue coated on the joint structure or the touch panel.

7. A display, comprising:
 a touch panel; and
 a housing, configured to assemble the touch panel and comprising:
  a first case, having an accommodating space at one side of the first case to accommodate the touch panel;
  a buffering structure made of soft material, wherein an outer edge of the buffering structure connects the first case, and an inner edge of the buffering structure extends toward the accommodating space;
  a joint structure made of hard material, wherein one side of the joint structure connects with one side of the buffering structure; and
  a second case, wherein one side of the second case being movably connected with the side of the first case is opposite to where the touch panel is accommodated;
 wherein, the first case, the buffering structure and the joint structure are ring structures, the touch panel is connected with the first case, and another side of the joint structure being opposite to the one side connected with the buffering structure is connected to the touch panel upon the touch panel being accommodated in the accommodating space,
 wherein the outer edge of the buffering structure connects to the first case and extends beneath a top lip of the first case, and one side of the joint structure connects with the inner edge of the buffering structure.

8. The display of claim 7, wherein an interval is between the joint structure and the first case.

9. The display of claim 7, wherein the hard material used to make the joint structure comprises plastic or metal.

* * * * *